United States Patent
Ogino et al.

(10) Patent No.: US 8,125,169 B2
(45) Date of Patent: Feb. 28, 2012

(54) ROTATING ELECTRICAL MACHINE CONTROL SYSTEM AND VEHICLE DRIVE SYSTEM

(75) Inventors: Daisuke Ogino, Anjo (JP); Takashi Yoshida, Anjo (JP); Subrata Saha, Anjo (JP); Jin Izawa, Obu (JP); Norio Tomiya, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 415 days.

(21) Appl. No.: 12/458,145

(22) Filed: Jul. 1, 2009

(65) Prior Publication Data
US 2010/0026218 A1 Feb. 4, 2010

(30) Foreign Application Priority Data
Jul. 31, 2008 (JP) .................... 2008-198568

(51) Int. Cl.
*H02P 27/00* (2006.01)
(52) U.S. Cl. .......... 318/400.03; 318/139; 318/430; 318/400.09; 180/65.29; 180/65.285; 307/9.1
(58) Field of Classification Search ........... 318/400.03, 318/400.09, 139, 434, 430, 432; 180/65.29, 180/65.285; 307/9.1
See application file for complete search history.

(56) References Cited

U.S. PATENT DOCUMENTS

| | | | |
|---|---|---|---|
| 5,883,484 A | 3/1999 | Akao | |
| 7,133,602 B2 | 11/2006 | Yamada | |
| 7,759,817 B2 * | 7/2010 | Soma et al. | 307/9.1 |
| 7,852,029 B2 * | 12/2010 | Kato et al. | 318/434 |
| 7,999,499 B2 * | 8/2011 | Tanaka et al. | 318/434 |
| 2004/0145338 A1 | 7/2004 | Nakamura et al. | |
| 2006/0066270 A1 * | 3/2006 | Kumagai et al. | 318/139 |
| 2007/0158121 A1 | 7/2007 | Sato | |
| 2009/0021200 A1 | 1/2009 | Yaguchi | |
| 2009/0058337 A1 * | 3/2009 | Kato et al. | 318/400.09 |
| 2009/0237019 A1 * | 9/2009 | Yamakawa et al. | 318/400.09 |
| 2009/0242293 A1 * | 10/2009 | Tanaka et al. | 180/65.285 |

FOREIGN PATENT DOCUMENTS

| | | |
|---|---|---|
| JP | A-10-66383 | 3/1998 |
| JP | A-2005-210779 | 8/2005 |
| JP | A-2006-333693 | 12/2006 |
| JP | A-2007-12568 | 1/2007 |
| WO | WO 03/056694 A1 | 7/2003 |
| WO | WO 2006/095497 A1 | 9/2006 |
| WO | WO 2007/126038 A1 | 11/2007 |

* cited by examiner

*Primary Examiner* — Paul Ip
(74) *Attorney, Agent, or Firm* — Oliff & Berridge, PLC

(57) ABSTRACT

A rotating electrical machine control system includes a frequency converting portion that is interposed between a rotating electrical machine for driving a vehicle and a DC power source for supplying electric power to the rotating electrical machine, and that converts an output of the DC power source to an AC output at least during powering operation of the rotating electrical machine; a voltage converting portion that is interposed between the DC power source and the frequency converting portion, and that boosts the output of the DC power source based on a boost command value which is set according to a target torque and a rotational speed of the rotating electrical machine; and a control portion for controlling the frequency converting portion and the voltage converting portion.

10 Claims, 8 Drawing Sheets

F I G. 12A
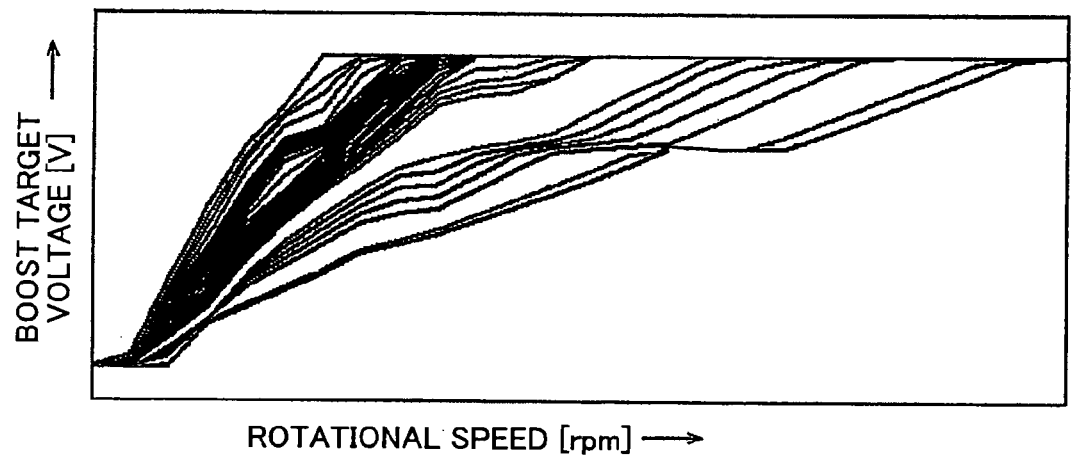
F I G. 12B
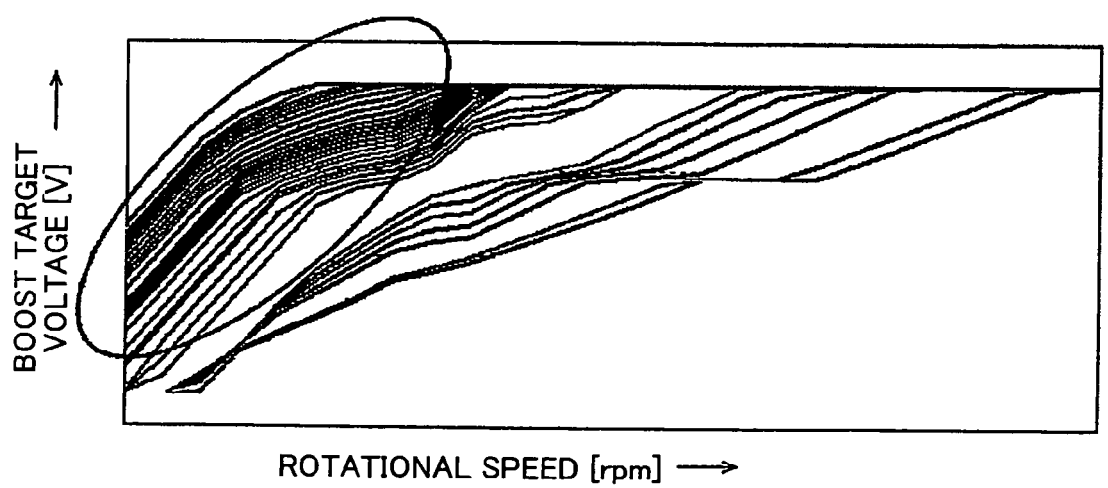

ROTATING ELECTRICAL MACHINE CONTROL SYSTEM AND VEHICLE DRIVE SYSTEM

CROSS-REFERENCE TO RELATED APPLICATION

The disclosure of Japanese Patent Application No. 2008-198568 filed on Jul. 31, 2008 including the specification, drawings and abstract is incorporated herein by reference in its entirety.

BACKGROUND

The present invention relates to a rotating electrical machine control system that includes a power supply converting portion for boosting an output of a DC (direct current) power source, and that controls a rotating electrical machine for driving a vehicle. Moreover, the present invention relates to a vehicle drive system including the rotating electrical machine control system.

In recent years, automobiles having a smaller environmental burden than automobiles driven by an internal combustion engine in which fossil fuel is combusted have been proposed. Examples of such automobiles include electric cars driven by a motor as a rotating electrical machine, and hybrid cars driven by an internal combustion engine and a motor. Motors which are mounted on the electric cars and the hybrid cars are expected to provide a desirable torque suitable for passenger car driving over a wide speed range (rotational-speed range).

A motor as a rotating electrical machine (a motor and a generator) operates based on a principle of generating a force (torque) by a magnetic field and a current. However, during rotation of the motor, the force is applied in the magnetic field, causing a so-called counter electromotive force. The counter electromotive force is generated in a direction that prevents the current flow which generates the torque. This reduces the current flowing in the magnetic field for rotating the motor, thereby reducing the force (torque). The counter electromotive force increases as the rotational speed of the motor increases. Thus, when the rotational speed reaches a certain value, a generated current reaches a driving current due to the counter electromotive force, and the motor cannot be controlled. Therefore, "field-weakening control" is performed in order to reduce the force of the field magnet generating the magnetic field to suppress generation of the counter electromotive force. However, since the field-weakening control reduces the force of the field magnet, the intensity of the magnetic field is also reduced, resulting in reduction of the maximum torque obtained. Moreover, reduction in efficiency due to increased losses has also been pointed out.

In view of this problem, Japanese Patent Application Publication No. JP-A-H10-66383 (Patent Document 1) proposes a technique of boosting a battery voltage for supplying driving electric power to a motor in order to shift the rotational speed at which shifting to the field-weakening control is performed to a higher rotational speed. According to this technique, the battery voltage is boosted by a booster circuit (converter) according to the position of a target operating point of the motor which is set according to the torque and the rotational speed. This enables a region where the field-weakening control is performed to be shifted to a higher output side (a higher torque side and a higher rotational speed side). In the example described in Patent Document 1, a region where normal field control (typically, maximum torque control) is performed without performing the field-weakening control is increased stepwise by setting a plurality of stages of boosted voltage values.

Japanese Patent Application Publication No. JP-A-2005-210779 (Patent Document 2) discloses a control technique of preventing an excessive current from flowing into such a booster circuit (power supply unit). According to this technique, a torque command of a rotating electrical machine is limited so that the sum of power consumption of the rotating electrical machine and a variation in electric power accumulated in a smoothing capacitor does not exceed the output limitation electric power of the booster circuit.

RELATED ART DOCUMENT

Patent Document

[Patent Document 1] Japanese Patent Application Publication No. JP-A-H10-66383 (paragraphs 3 to 12, FIGS. 1 and 2, and the like)
[Patent Document 2] Japanese Patent Application Publication No. JP-A-2005-210779 (claim 1 and the like)

SUMMARY

In a situation where a boosted voltage rapidly changes, a response delay is generated due to the transmission time for a control device to obtain a measured boosted voltage, the computation time of the control device, and the like. Due to the response delay, a rotating electrical machine is drivingly controlled on the assumption that a voltage lower than the actual voltage is applied. Since the actually applied voltage is higher than the measured voltage value recognized by the control device, the rotating electrical machine outputs a higher torque than a target torque. As a result, current consumption of the rotating electrical machine increases unnecessarily, and a large amount of current including the increase is drawn from the battery. In other words, if the voltage boosted by the converter rapidly increases in the state where the rotating electrical machine is operated with a high torque and the battery power consumption is high, an excessive amount of current is drawn from the battery, which may result in an overcurrent. Even if the torque limitation is performed using the technique of Patent Document 2, it is not sufficient because it does not consider the delay time such as the transmission time of the measured boosted voltage.

The present invention has been developed in view of the above problems, and it is an object of the present invention to provide a rotating electrical machine control system capable of suppressing power consumption to prevent an overcurrent of a battery even when a rotating electrical machine is driven by boosting the battery voltage in a state where power consumption is large.

A characteristic structure of a rotating electrical machine control system according to a first aspect of the present invention for achieving the above object is in that the rotating electrical machine control system includes: a frequency converting portion that is interposed between a rotating electrical machine for driving a vehicle and a DC power source for supplying electric power to the rotating electrical machine, and that converts an output of the DC power source to an AC output at least during powering operation of the rotating electrical machine; a voltage converting portion that is interposed between the DC power source and the frequency converting portion, and that boosts the output of the DC power source based on a boost command value which is set according to a target torque and a rotational speed of the rotating electrical machine; and a control portion for controlling the frequency converting portion and the voltage converting portion, and the control portion limits an increase in the boost command value when power consumption of the rotating electrical machine exceeds a predetermined electric-power limitation value.

When the voltage boosted by and output from the voltage converting portion rapidly increases, the power consumption of the rotating electrical machine may increase due to a response delay of feedback control. Especially when the power consumption of the rotating electrical machine is large and close to allowable electric power of the DC power source, the power consumption may exceed the allowable electric power. According to the characteristics of the first aspect of the present invention, however, increase in the boost command value is limited when the power consumption of the rotating electrical machine exceeds the predetermined electric-power limitation value. Limiting increase in the boost command value suppresses increase in the voltage boosted by and output from the voltage converting portion, whereby increase in power consumption of the rotating electrical machine is suppressed. As a result, the DC power source can be prevented from becoming an overcurrent.

Preferably, the electric-power limitation value is set to a value obtained by subtracting electric power increased in a delay time before the control portion obtains a boosted voltage value boosted by the voltage converting portion, from allowable electric power which can be output from the DC power source.

According to the above structure, the value obtained by subtracting electric power increased in the delay time from the allowable electric power which can be output from the DC power source is set as the electric-power limitation value. This can suppress a current from being excessively drawn from the DC power source due to increase in power consumption associated with a response delay such as a detection delay of the boosted voltage. As a result, the DC power source can be prevented from becoming an overcurrent in a desirable manner.

Moreover, in the rotating electrical machine control system according to the first aspect of the present invention, it is preferable that the control portion determine the boost command value which is set according to the target toque and the rotational speed of the rotating electrical machine, and perform a control to shift a control state from non-boost control, in which the output of the DC power source is supplied to the frequency converting portion through the voltage converting portion without being boosted, to boost control, in which the output of the DC power source is boosted by the voltage converting portion and supplied to the frequency converting portion, on a condition that the boost command value exceeds a voltage of the DC power source. Preferably, electric power which is obtained by subtracting increased electric power transiently produced during the shifting, from the allowable electric power which can be output from the DC power source, and which is lower than the electric-power limitation value is used as reference electric power, and the shifting from the non-boost control to the boost control is performed in a region where the power consumption of the rotating electrical machine is equal to or lower than the reference electric power.

In general, the voltage converting portion has a series circuit of an upper-stage switching element connected to a positive side, and a lower-stage switching element connected to a negative side. When the control state is shifted from the non-boost control to the boost control, a dead time, during which both the upper-stage switching element and the lower-stage switching element are turned off, is provided in order to prevent short-circuit between the positive side and the negative side. Due to the dead time, the boosting operation cannot be performed in a predetermined voltage range according to the system in a state where a boost target value is increasing. After the shifting from the non-boost control to the boost control, the output of the voltage converting portion rapidly and significantly increases beyond this voltage range. A response delay to such a rapid voltage increase may transiently generate increased electric power, and a large current may be drawn from the DC power source, causing an overcurrent. However, since conditions for shifting from the non-boost control to the boost control, that is, a shift boundary, is set in view of the increased electric power caused by the dead time, the power consumption of the rotating electrical machine can be prevented from reaching the allowable electric power during this shifting, and also, the possibility that the power consumption of the rotating electrical machine exceeds the electric-power limitation value can be significantly reduced. Moreover, since the shifting from the non-boost control to the boost control is performed in a state where the power consumption is still low, the possibility that the increased voltage transiently generated during the shifting from the non-boost control to the boost control causes the power consumption of the rotating electrical machine to exceed the electric-power limitation value, and increase in the boost command value is limited, can be significantly reduced. The shifting from the non-boost control to the boost control is required when increase in the torque and the rotational speed is required. Since the shifting from the non-boost control to the boost control is not prevented, drivability is improved when, for example, the rotating electrical machine is used in a vehicle drive system.

Preferably, the power consumption of the rotating electrical machine is obtained by using the target torque and the rotational speed of the rotating electrical machine.

Since the power consumption of the rotating electrical machine is not obtained based on actual measured current and voltage, the power consumption of the rotating electrical machine can be obtained without the influence of the delay of a sensor for measuring the voltage and the current. Therefore, if the power consumption of the rotating electrical machine exceeds the electric-power limitation value, this can be rapidly detected, and increase in the boost command value can be limited. As a result, the DC power source can be prevented from becoming an overcurrent in a desirable manner.

Preferably, the reference electric power is set as electric power obtained by subtracting the increased electric power generated when the target torque has a maximum value, from the allowable electric power.

The power consumption of the rotating electrical machine increases as the target torque increases. Thus, the difference between the allowable electric power and the power consumption reduces as the target torque increases. Moreover, the increased electric power, which is transiently generated due to a response delay to the rapidly increasing boosted voltage during shifting from the non-boost control to the boost control, increases as the target torque increases. The increased electric power, which is generated when the target torque has the maximum value, has a maximum value among the possible values of the increased electric power. Therefore, the electric power obtained by subtracting the increased electric power from the allowable electric power becomes the smallest when the target torque has the maximum value. By setting the shift boundary based on this electric power as the reference electric power, generation of the overcurrent of the DC power source, associated with the transient voltage increase at the beginning of the boosting operation, can be suppressed in a desirable manner regardless of the magnitude of the target torque.

In the rotating electrical machine control system according to the first aspect of the present invention, it is preferable that the boost command value define a voltage value of an output of the voltage converting portion or a boosting ratio in the voltage converting portion, and the control portion limit the increase in the boost command value by fixing the boost command value.

Fixing the boost command value suppresses increase in the boosted voltage, i.e., the output of the voltage converting portion, and thus, suppresses increase in the power consumption of the rotating electrical machine. If the boost command value is a value defining the output voltage of the voltage converting portion, the boosted voltage is held constant, whereby increase in power consumption of the rotating electrical machine is suppressed. Moreover, if the boost command value defines the boosting ratio in the voltage converting portion, the boosted voltage is suppressed to a certain value or less. In the case where the power consumption of the rotating electrical machine exceeds the electric-power limitation value, the voltage of the DC power source often tends to decrease, because it is a high load state where a large amount of current is being drawn from the DC current. If the boosting ratio in the voltage converting portion is fixed, and the DC voltage which is an input voltage to the voltage converting portion decreases, the output voltage from the voltage converting portion also decreases. Therefore, in the case where the boost command value defines the boosting ratio in the voltage converting portion, the boosted voltage is suppressed to a certain value or less. Thus, fixing the boost command value suppresses increase in the boosted voltage, i.e., increase in output of the voltage converting portion. This prevents an increased amount of current from being drawn from the DC power source due to increase in power consumption associated with a detection delay of the boosted voltage value, whereby the DC power source can be prevented from becoming an overcurrent.

Preferably, the control portion of the rotating electrical machine control system according to the first aspect of the present invention limits the increase in the boost command value by inhibiting the shifting from the non-boost control, in which the output of the DC power source is supplied to the frequency converting portion through the voltage converting portion without being boosted, to the boost control, in which the output of the DC power source is boosted by the voltage converting portion and supplied to the frequency converting portion.

As described above, the output of the voltage control portion rapidly and significantly increases when the control state is shifted from the non-boost control to the boost control. A response delay to this rapid voltage increase transiently generates the increased electric power, and a large current may be drawn from the DC power source, thereby causing an overcurrent. Inhibiting the shifting from the non-boost control to the boost control prevents rapid and significant increase in the output of the voltage converting portion. This prevents an increased amount of current from being drawn from the DC power source due to increase in power consumption associated with a detection delay of the boosted voltage value, whereby the DC power source can be prevented from becoming an overcurrent.

Preferably, the frequency converting portion of the rotating electrical machine control system according to the first aspect of the present invention converts a DC input thereto into an AC, based on a modulation ratio which is set according to a voltage value of the DC input to the frequency converting portion and the target torque.

Accurate modulation based on an actual voltage is implemented by setting the modulation ratio based on an actual measured value of the boosted voltage by the voltage converting portion. In normal operation, the power consumption of the rotating electrical machine is less likely to change rapidly, and it is preferable to set the modulation ratio by using the actual measured value of the boosted voltage, because the rotating electrical machine can be controlled with low losses. When the power consumption of the rotating electrical machine increases rapidly and exceeds the electric-power limitation value, boosting is suppressed according to the determination based on the electric-power limitation value, as described above. Whether the power consumption of the rotating electrical machine exceeds the electric-power limitation value or not can be determined not only by the power consumption obtained from an actual measured value, but also by the value obtained using the target torque and the rotational speed of the rotating electrical machine. In normal operation, the rotating electrical machine can be controlled by using an actual measured value which enables accurate, low-loss control. On the other hand, in such a situation that the power consumption rapidly increases, the rotating electrical machine can be controlled by using a value other than the actual measured value. Thus, excellent control can be implemented according to the situation without the influence of the response delay.

A vehicle drive system according to a second aspect of the present invention includes: the above rotating electrical machine control system according to the first aspect of the present invention; a first rotating electrical machine and a second rotating electrical machine as the rotating electrical machine; and a power distribution mechanism for distributing a driving force generated from a drive source other than the first rotating electrical machine and the second rotating electrical machine. The vehicle drive system can be structured so that one of the driving force distributed by the power distribution mechanism is transmitted to a wheel, another one of the driving force distributed by the power distribution mechanism is transmitted to the first rotating electrical machine, and a driving force generated by the second rotating electrical machine is transmitted to the wheel.

The vehicle drive system of this structure can implement a hybrid vehicle that includes a pair of rotating electrical machines and a drive source other than the pair of rotating electrical machines (e.g., engine), and that performs so-called split power distribution. This hybrid vehicle can implement operation of the pair of rotating electrical machines in such a manner that satisfies the rotational speed and the torque required for the rotating electrical machines. Moreover, this hybrid vehicle can easily implement a system structured so that respective voltages required for the pair of rotating electrical machines are obtained by a single voltage converting portion.

Moreover, in the vehicle drive system according to the second aspect of the present invention, it is preferable that the power distribution mechanism include a planetary gear mechanism having a first rotary element, a second rotary element, and a third rotary element in order of a rotational speed, and the first rotating electrical machine be connected to the first rotary element, the drive source other than the rotating electrical machines be connected to the second rotary element, and the second rotating electrical machine and the third rotary element be connected to the wheel.

By using this structure, a hybrid vehicle performing split power distribution can be easily implemented by using a single planetary gear mechanism.

BRIEF DESCRIPTION OF THE DRAWINGS

FIG. 12 shows graphs showing boost target voltages for each target torque.

DETAILED DESCRIPTION OF EMBODIMENTS

Figure 1:
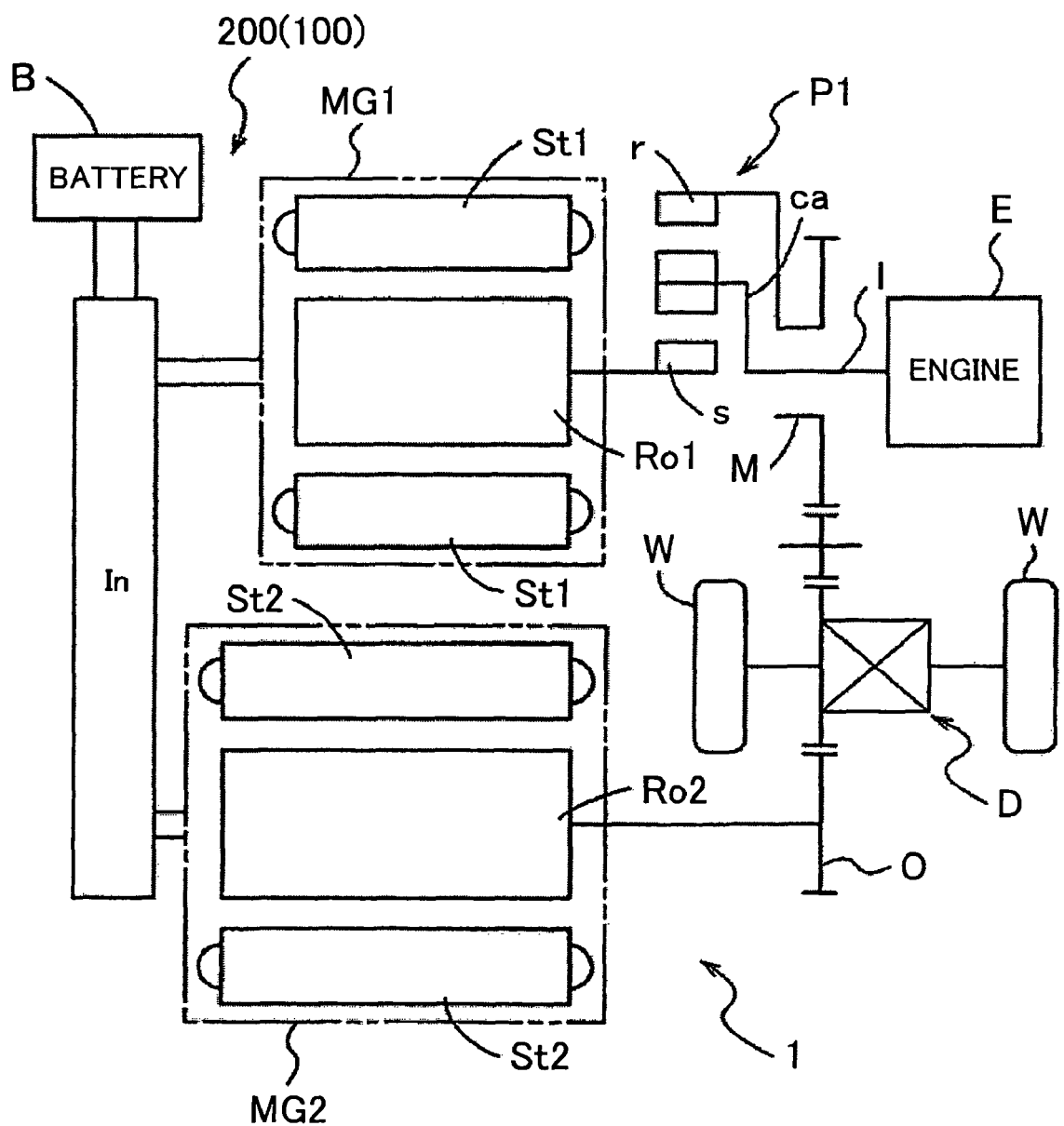
FIG. 1 is a block diagram schematically showing a structure of a drive system of a vehicle drive system.
Figure 2:
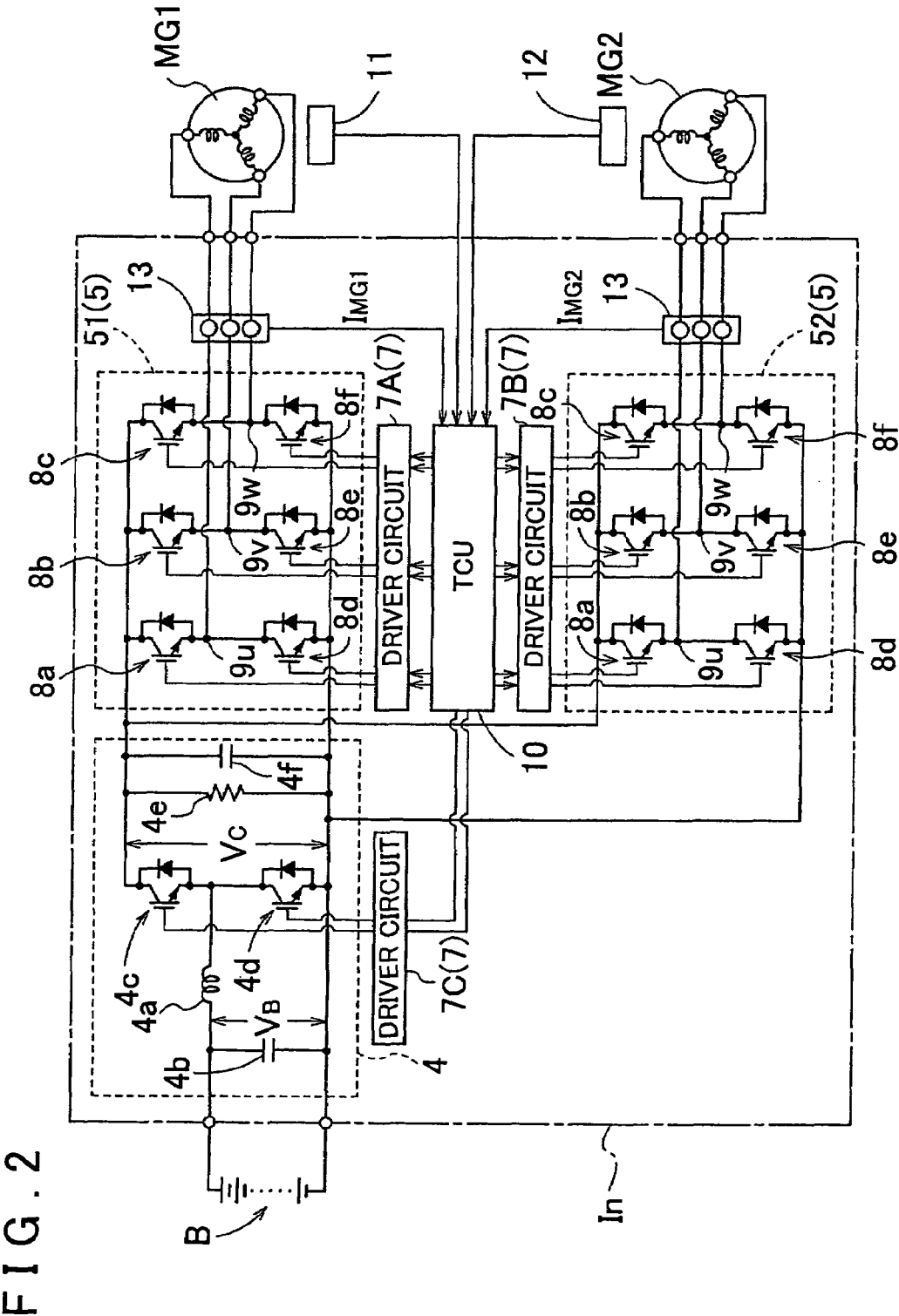
FIG. 2 is a block diagram schematically showing a structure of a rotating electrical machine control system.

Hereinafter, an embodiment of a rotating electrical machine control system according to the present invention will be described with reference to the accompanying drawings. The rotating electrical machine control system is incorporated in a vehicle drive system, and functions to control operation of rotating electrical machines included in the vehicle drive system. FIG. 1 is a block diagram schematically showing a structure of a drive system of a vehicle drive system 200, and FIG. 2 is a block diagram schematically showing a structure of a rotating electrical machine control system having, as a main component, a rotating electrical machine drive device In provided to control rotating electrical machines MG1, MG2. The rotating electrical machine drive device In corresponds to a rotating electrical machine control system of the present invention.

As shown in FIG. 1, a vehicle includes an engine E as an internal combustion engine, and the pair of rotating electrical machines MG1, MG2. The vehicle drive system 200 is a so-called hybrid system, and includes a hybrid drive device 1 between the engine E and wheels W. Various known types of internal combustion engines, such as a gasoline engine and a diesel engine, can be used as the engine E. As described below, the rotating electrical machines MG1, MG2 operate as a motor (electric motor) or a generator (electric generator). Thus, in the following description, reference characters MG1, MG2 are sometimes omitted unless any of the rotating electrical engines needs to be specified. The vehicle is capable of running with a driving force obtained from the rotating electrical machine serving as a motor or from the engine E. At least a part of the driving force generated by the engine E is converted to electric power in the rotating electrical machine serving as a generator, and is supplied to charge a battery B or to drive the rotating electrical machine serving as a motor. Moreover, during a braking operation, the rotating electrical machine can generate electric power by the braking force to regenerate the electric power to the battery B.

An input shaft I of the hybrid drive device 1 is connected to an output rotary shaft such as a crankshaft of the engine E. Note that it is also preferable to connect the input shaft I to the output rotary shaft of the engine E through a damper, a clutch, and the like. The output of the hybrid drive device 1 is transmitted to the wheels W through a differential unit D and the like. The input shaft I is further connected to a carrier ca of a power distribution mechanism P1, and an intermediate shaft M connected to the wheels W through the differential unit D is connected to a ring gear r.

The first rotating electrical machine MG1 includes a stator St1, and a rotor Ro1 rotatably supported radially inside the stator St1. The rotor Ro1 of the first rotating electrical machine MG1 is connected so as to rotate integrally with a sun gear s of the power distribution mechanism P1. The second rotating electrical machine MG2 includes a stator St2, and a rotor Ro2 rotatably supported radially inside the stator St2. The rotor Ro2 of the second rotating electrical machine MG2 is connected so as to rotate integrally with an output gear O, and is connected to an input side of the differential unit D.

As shown in FIG. 1, the first rotating electrical machine MG1 and the second rotating electrical machine MG2 are electrically connected to the battery (DC power source) B through the rotating electrical machine drive device (inverter device) In. The first rotating electrical machine MG1 and the second rotating electrical machine MG2 are structured so as to be able to function as a motor (electric motor) supplied with electric power for generating motive power, and as a generator (electric generator) supplied with motive power for generating electric power.

In the structural example of the present embodiment, the first rotating electrical machine MG1 mainly functions as a generator for generating electric power by a driving force received through the sun gear s of the power distribution mechanism P1, and serves to charge the battery B or to supply electric power for driving the second rotating electrical machine MG2. However, the first rotating electrical machine MG1 may function as a motor during high-speed running of the vehicle and the like. On the other hand, the second rotating electrical machine MG2 mainly functions as a motor for assisting a driving force for running the vehicle. During deceleration of the vehicle and the like, the second rotating electrical machine MG2 functions as a generator for regenerating an inertia force of the vehicle as electric energy. Operation of the first rotating electrical machine MG1 and the second electrical machine MG2 is controlled by a TCU (trans-axle control unit) 10 (see FIG. 2). The TCU 10 functions as a control portion of the present invention, and controls the rotating electrical machines MG1 and MG2 through a voltage converting portion 4 and a frequency converting portion 5 as described below.

As shown in FIG. 1, the power distribution mechanism P1 is formed by a single-pinion type planetary gear mechanism positioned coaxially with the input shaft I. That is, the power distribution mechanism P1 has the following elements as rotary elements: the carrier ca supporting a plurality of pinion gears; and the sun gear s and the ring gear r each meshing with the pinion gears. The sun gear s as a first rotary element is connected so as to rotate integrally with the rotor Ro1 of the first rotating electrical machine MG1. The carrier ca as a second rotary element is connected so as to rotate integrally with the input shaft I connected to the output rotary shaft of the engine E. The ring gear r as a third rotary element is connected so as to rotate integrally with the intermediate shaft M. The ring gear r is connected to the differential unit D through the intermediate shaft M.

In the structure of FIG. 1, the first rotating electrical machine MG1 is connected to the sun gear s as the first rotary element, and the engine E as a driving source other than the rotating electrical machines MG1 and MG2 is connected to the carrier ca as the second rotary element. The second rotating electrical machine MG2 and the ring gear r as the third rotary element are connected to the wheels W through the differential unit D. However, the structure of the drive system is not limited to this structure. The second rotating electrical machine MG2 may be directly connected to the differential unit D, or may be connected to the third rotary element or another drive transmission element, and connected to the differential unit D through the rotary element or the drive transmission element.

FIG. 2 is a block diagram schematically showing a structure of the rotating electrical machine control system having the rotating electrical machine drive device In as a main component. This rotating electrical machine control system includes the battery B, the rotating electrical machines MG1, MG2, and the rotating electrical machine drive device interposed between the battery B and the rotating electrical machines MG1, MG2. The rotating electrical machine drive device In includes the voltage converting portion (converter) 4 and the frequency converting portion (inverter) 5, sequentially from the battery B side. As shown in FIG. 2, in the present embodiment, frequency converting portions 51, 52 are separately provided for the pair of rotating electrical machines MG1, MG2 as the frequency converting portion 5. Current sensors 13 for measuring a current flowing in the respective rotating electrical machines are provided between the frequency converting portion 5 and each rotating electrical machine MG1, MG2. Note that this example shows the structure of measuring three phases of current. However, since the three phases are in an equilibrium state, and the sum of respective instantaneous values is zero, it is also possible to measure only two phases of current and to obtain the remaining one phase of current by computation in the TCU 10. Note that the battery B is capable of supplying electric power to the rotating electrical machines MG1, MG2, and is capable of accumulating electric power supplied from the rotating electrical machines MG1, MG2.

The voltage converting portion 4 has a reactor 4a, a filter capacitor 4b, a pair of upper and lower switching elements 4c, 4d, a discharging resistor 4e, and a smoothing capacitor 4f. IGBTs (insulated gate bipolar transistors) or MOSFETs (metal oxide semiconductor field effect transistors) are preferably used as the switching elements 4c, 4d. The present embodiment shows an example using IGBTs.

An emitter of the upper-stage switching element 4c of the voltage converting portion 4 is connected to a collector of the lower-stage switching element 4d, and is connected to a positive side of the battery B through the reactor 4a. A collector of the upper-stage switching element 4c is connected to a positive input side of the frequency converting portion 5. An emitter of the lower-stage switching element 4d is connected to a negative side (ground) of the battery B. Since a negative input side of the frequency converting portion 5 is also grounded, the emitter of the lower-stage switching element 4d is connected to the negative input side of the frequency converting portion 5.

Respective gates of the upper-stage switching element 4c and the lower-stage switching elements 4d are connected to the TCU 10 through a driver circuit 7 (7C). The switching elements 4c, 4d are controlled by the TCU 10, and boost a voltage from the battery B to supply the boosted voltage to the frequency converting portion 5. The TCU 10 controls the switching elements 4c, 4d based on a boost command value which is set according to a target torque of the rotating electrical machine. More specifically, the TCU 10 boosts the voltage of the battery B and outputs the boosted voltage by turning off the upper-stage switching element 4c, while turning on or off the lower-stage switching element 4d by, e.g., PWM control. On the other hand, when the rotating electrical machine performs regenerative operation, the voltage converting portion 4 regenerates electric power generated by the rotating electrical machine to the battery B. For example, the TCU 10 regenerates electric power through the voltage converting portion 4 by turning off the lower-stage switching element 4d and turning on the upper-stage switching element 4c. Note that the upper-stage switching element 4c may be PWM-controlled in the case where electric power generated by the rotating electrical machine is down-converted and regenerated to the battery B.

The frequency converting portion 5 is formed by a bridge circuit. Two switching elements are connected in series between the positive input side and the negative input side of the frequency converting portion 5, and three of this series circuit are connected in parallel. That is, the bridge circuit is structured so that three sets of series circuits respectively correspond to U-phase, V-phase, and W-phase stator coils of the rotating electrical machines MG1, MG2. In FIG. 2, reference character 8a indicates a U-phase upper-stage switching element, reference character 8b indicates a V-phase upper-stage switching element, reference character 8c indicates a W-phase upper-stage switching element, reference character 8d indicates a U-phase lower-stage switching element, reference character 8e indicates a V-phase lower-stage switching element, and reference character 8f indicates a W-phase lower-stage switching element. Note that it is preferable to use IGBTs or MOSFETs as the switching elements 8a through 8f of the frequency converting portion 5. The present embodiment shows an example using IGBTs.

As shown in FIG. 2, respective collectors of the upper-stage switching elements 8a, 8b, 8c of each phase are connected to a positive output side of the voltage converting portion 4 (the positive input side of the frequency converting portion 5), and respective emitters thereof are connected to respective collectors of the lower-stage switching elements 8d, 8e, 8f of each phase, respectively. Respective emitters of the lower-stage switching elements 8d, 8e, 8f of each phase are connected to a negative output side of the voltage converting portion 4 (the negative input side of the frequency converting portion 5), that is, the negative side (ground) of the battery B. Respective gates of the switching elements 8a through 8f are connected to the TCU 10 through a driver circuit 7 (7A, 7B), and are independently switching-controlled.

Respective intermediate points 9u, 9v, 9w of the series circuits formed by the pairs of switching elements (8a, 8d), (8b, 8e), (8c, 8f) of each phase (connection points of the switching elements) are connected to the U-phase, V-phase, and W-phase stator coils of the rotating electrical machines MG1 and MG2, respectively. A driving current supplied to each coil is detected by the corresponding current sensor 13.

The detected value of the current sensor 13 is supplied to the TCU 10, and used for feedback control.

Each rotating electrical machine MG1, MG2 includes a rotation detecting sensor 11, 12 such as a resolver functioning as a part of a rotation detecting portion, and detects the rotating angle (mechanical angle) of the corresponding rotor Ro1, Ro2. Each rotation detecting sensor 11, 12 is set according to the number of poles (the number of pole pairs) of the corresponding rotor Ro1, Ro2, and is also capable of converting the rotation angle of the rotor Ro1, Ro2 to an electric angle θ, and outputting a signal according to the electric angle θ. The TCU 10 computes the respective rotation speeds (angular velocities ω) of the rotating electrical machines MG1 and MG2 and the control timing of each switching element 8a through 8f of the frequency converting portion 5, based on the respective rotation angles.

The TCU 10 supplies a three-phase AC (alternating current) driving current to each rotating electrical machine MG1, MG2 by PWM-controlling the switching elements 8a through 8f based on the target torque and the rotational speed (the number of revolutions) of the rotating electrical machines MG1, MG2. Each rotating electrical machine MG1, MG2 is thus powered according to the target torque. In the case where the rotating electrical machines MG1 and MG2 serve as generators and the TCU 10 receives electric power from the rotating electrical machines, the TCU 10 controls the frequency converting portion 5 so as to covert an AC of a predetermined frequency to a DC.

Figure 3:
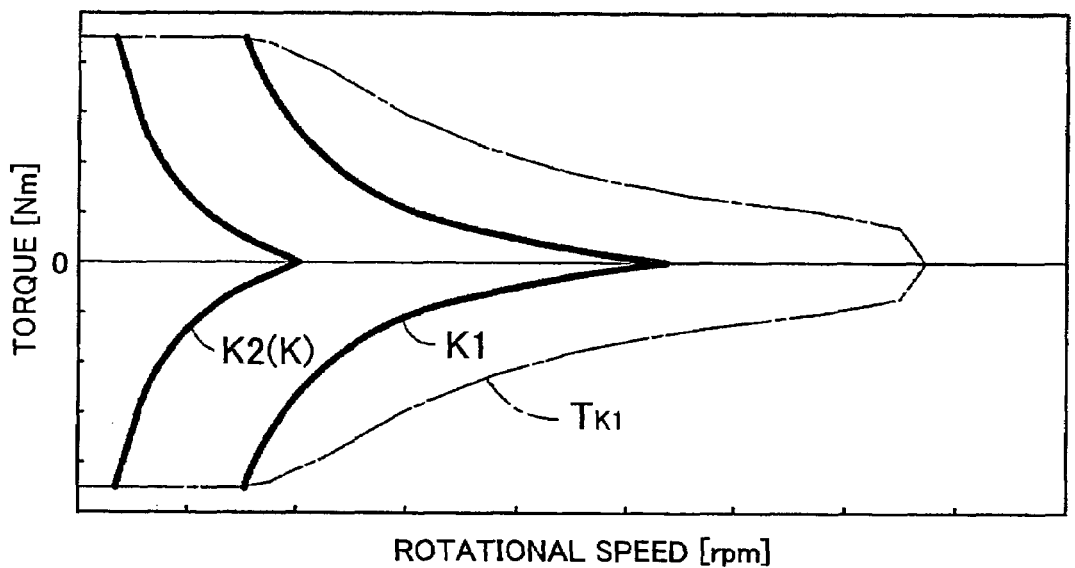
FIG. 3 is a correlation diagram between the rotational speed and the torque of a rotating electrical machine.

FIG. 3 is a correlation diagram between the rotational speed and the torque of the rotating electrical machines. As described above, the rotating electrical machine drive device In includes the voltage converting portion 4, and is capable of boosting the DC voltage of the battery B. That is, the rotating electrical machine drive device In boosts the voltage of the battery B for supplying driving electric power to the rotating electrical machines, in order to shift the rotating speed and the torque at which shifting to the field-weakening control is performed to a higher rotating speed and a higher torque. Reference character K2 (K) in the drawing indicates a shift boundary for starting boosting by the voltage converting portion 4. As can be seen from FIG. 3, the shift boundary K2 (K) is set based on the correlation between the target torque and the rotational speed of the rotating electrical machines.

When at least one of the absolute rotational speed and the absolute target torque of the rotating electrical machines is larger than the shift boundary K2, the voltage converting portion 4 boosts the output of the battery B. A boost command value, which is a boost target value, may be set stepwise or steplessly as a boosted voltage value. Reference character K1 in the drawing indicates a boundary for setting the maximum boost command value, and reference character $T_{K1}$ indicates a torque region that can be output from the rotating electrical machines when boosting is performed based on the boost command value. The TCU 10 shifts the control state of the voltage converting portion 4 on the condition that the target torque and the rotational speed of the rotating electrical machines exceed the shift boundary K2. More specifically, the TCU 10 performs a control to shift the control state of the voltage converting portion 4 from non-boost control, in which the output of the battery B is supplied to the frequency converting portion 5 through the voltage converting portion 4 without being boosted, to boost control, in which the output of the battery B is boosted by the voltage converting portion 4 and supplied to the frequency converting portion 5.

The frequency converting portion 5 drives the rotating electrical machines MG1, MG2 by converting the DC after the DC voltage is boosted by the voltage converting portion 4 to the AC at a modulation ratio according to the target torque and the rotational speed. A voltage value $V_C$ boosted by the voltage converting portion 4 is measured by a not-shown voltage sensor or the like, and the TCU 10 obtains the boosted voltage value $V_C$. However, there is a delay time before the TCU 10 obtains the boosted voltage value $V_C$, due to the influences of, e.g., sampling intervals of the voltage sensor and the TCU 10 which operates according to a predetermined clock, and especially due to a filtering process of, e.g., averaging a plurality of detected voltage values to reduce the noise of the detected voltage of the voltage sensor. In the case where the boost command value increases in a short time, and the boosted voltage $V_C$ increases in a short time, this delay time causes the TCU 10 to recognize a voltage which is applied to the frequency converting portion 5 to drive the rotating electrical machines MG1, MG2, as a voltage smaller than an actual value. The TCU 10 modulates the DC to the AC at a modulation ratio corresponding to this smaller voltage value, and controls the rotating electrical machines MG1, MG2 to achieve the target torque. However, since the actual value of the boosted voltage $V_C$ is larger than the voltage value recognized by the TCU 10, the rotating electrical machines MG1, MG2 output an excessive torque. This causes an excessive amount of current to be drawn from the battery B, which may result in an overcurrent.

Figure 4:
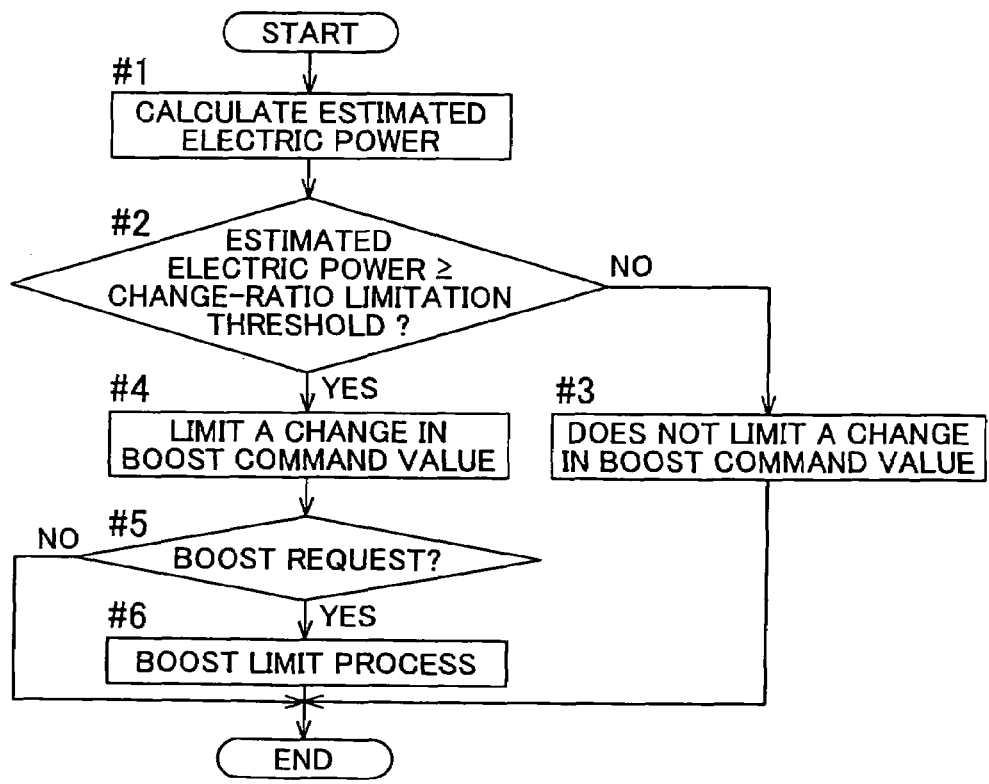
FIG. 4 is a flowchart illustrating a control operation of limiting a boost command value.
Figure 5:
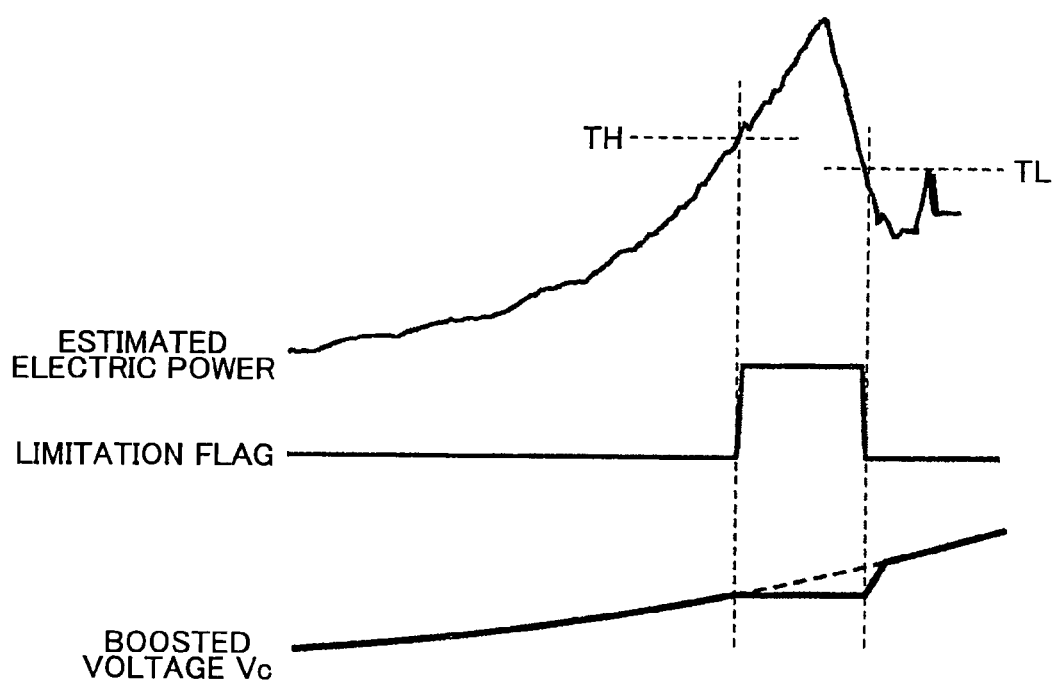
FIG. 5 is a waveform chart schematically showing the relation between power consumption and a boosted voltage when the boost command value is limited.
Figure 6:
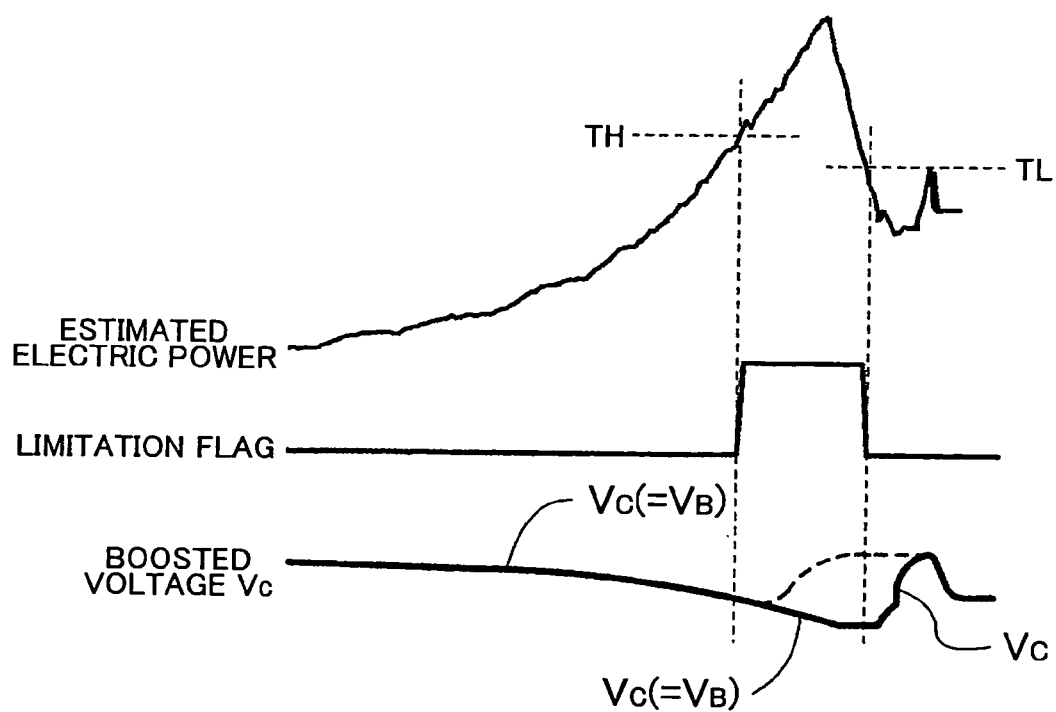
FIG. 6 is a waveform chart schematically showing the relation between power consumption and a boosted voltage when the boost command value is limited.

Such a phenomenon becomes significant especially when the rotating electrical machines MG1, MG2 are driven with a high load (high torque and high rotation), and consume a large amount of power. Therefore, the TCU 10 limits increase in boost command value to the voltage converting portion 4 if the power consumption of the rotating electrical machines exceeds a predetermined electric-power limitation value. Hereinafter, such limitation of the boost command value will be described in detail. FIG. 4 is a flowchart showing a control to limit the boost command value. FIGS. 5 and 6 are waveform charts schematically showing the relation between the power consumption and the boosted voltage $V_C$ when the boost command value is limited. FIG. 5 is a waveform chart showing a state after exceeding the shift boundary K, in which the voltage converting portion 4 is in the boost control state. FIG. 6 is a waveform chart showing a state when exceeding the shift boundary K, in which the control state of the voltage converting portion 4 is shifted from the non-boost control to the boost control.

First, the TCU 10 obtains power consumption of the rotating electrical machines. In the present embodiment, as shown in FIG. 4, the TCU 10 calculates estimated electric power of the rotating electrical machines MG1, MG2 as power consumption (#1). The power consumption can be calculated based on an actual measured value of the DC voltage $V_C$ applied to the frequency converting portion 5 by the not-shown voltage sensor, and current values ($I_{MG2}$, $I_{MG1}$) measured by the respective current sensors 13. However, the actual measured value may be lower than an actual value due to the delay time, as described above. Thus, the TCU 10 obtains the estimated electric power by computation in order to obtain a value closer to actual power consumption.

In the present embodiment, the estimated electric power is obtained by computation using the rotational speed and the target torque of the rotating electrical machines. In this case, the power consumption of the rotating electrical machines can be obtained without the influences of the delay time caused by measurement of the voltage and the current. The present invention is not limited to this, and the estimated electric power may be obtained in consideration of the electric power corresponding to the delay time by, for example, multiplying an electric power value computed based on the actual measured value of the DC voltage $V_C$ and the current values ($I_{MG2}$, $I_{MG1}$) by a predetermined coefficient, or adding a predetermined offset value to this electric power value.

Then, the TCU 10 determines whether the estimated electric power has reached a change-ratio limitation threshold TH or not (#2 in FIG. 4). That is, the TCU 10 determines whether the power consumption of the rotating electrical machines has reached close to allowable electric power of the battery B or not. If the estimated electric power has not reached the change-ratio limitation threshold TH, the TCU 10 controls the voltage converting portion 4 based on a normal boost command value without limiting a change in boost command value to the voltage converting portion 4.

On the other hand, if the estimated electric power has reached the change-ratio limitation threshold TH, it is very likely that the power consumption of the rotating electrical machines has reached close to the allowable electric power of the battery B. Thus, the TCU 10 limits a change in boost command value for controlling the voltage converting portion 4 (#4). Accordingly, the change-ratio limitation threshold TH corresponds to an electric-power limitation value of the present invention. For example, the expression "limit a change in boost command value" herein means that the boost command value is fixed. It is also possible to allow a decrease in boost command value and inhibit only increase in boost command value. These methods are preferable when the boost command value defines a target voltage which indicates the value of the boosted voltage $V_C$. When the boost command value defines the boosting ratio in the voltage converting portion 4, a change in boost command value may be limited by fixing the boosting ratio.

Referring to FIG. 5, a limitation flag becomes active when the estimated electric power reaches the change-ratio limitation threshold TH. The limitation flag is maintained active until the estimated electric power becomes lower than a change-ratio limitation release threshold TL. The change-ratio limitation release threshold TL is set to a lower value than the change-ratio limitation threshold TH, and the limitation flag has hysteresis. The control portion (TCU 10) of the present invention limits increase in boost command value when the power consumption of the rotating electrical machines exceeds a predetermined electric-power limitation value. As described above, since the limitation period starts when the power consumption (estimated electric power) exceeds the change-ratio limitation threshold TH, the change-ratio limitation threshold TH corresponds to the electric-power limitation value of the present invention. The limitation period continues as long as the power consumption is higher than the change-ratio limitation release threshold TL after exceeding the change-ratio limitation threshold TH. Therefore, the change-ratio limitation release threshold TL also corresponds to the electric-power limitation value of the present invention. Note that it is preferable to set the change-ratio limitation threshold TH to a value obtained by subtracting the amount of electric power which increases in the delay time before the TCU 10 obtains the voltage boosted by the voltage converting portion 4 from the allowable electric power ($W_{BMAX}$ described below) which can be output from the battery B.

Next, the TCU 10 determines whether there is a boost request to the voltage converting portion 4 or not (#5 in FIG. 4). If there is a boost request, the TCU 10 controls the voltage converting portion 4 while limiting boosting (#6). That is, the voltage converting portion 4 performs boosting based on the boost command value limited as described above. As shown in FIG. 5, if the boost control in which the voltage converting portion 4 boosts the output of the battery B has been being performed, the voltage converting portion 4 is controlled so that, for example, the output of the voltage converting portion 4 has the same voltage value. This corresponds to the case where the boost command value defines a target voltage indicating the value of the boosted voltage $V_C$, and limiting a change in boost command value is fixing the boost command value (target voltage).

The boost command value may define the boosting ratio in the voltage converting portion 4, and may limit a change in boost command value (boosting ratio) by fixing the boosting ratio. In this case, the voltage $V_C$ changes as follows. When the estimated electric power (power consumption) is large enough to exceed the change-ratio limitation threshold TH, a large current is being drawn from the battery B. Thus, the voltage $V_B$ of the battery B tends to decrease. If the boosting ratio is fixed in this state, the output of the voltage converting portion 4 also decreases with decrease in battery voltage $V_B$. In the case where the voltage $V_B$ of the battery B is constant during the period in which the limitation flag is active, the output of the voltage converting portion 4 is also maintained constant. Thus, limiting increase in boost command value prevents at least the output voltage $V_C$ of the voltage converting portion 4 from increasing, whereby increase in power consumption can be suppressed.

A broken line in the waveform of the boosted voltage $V_C$ shown at the bottom of FIG. 5 indicates a boost command value defined as a target voltage. After the limitation period in which the limitation flag is active has passed, boosting is performed again according to the boost command value (target voltage). At this time, the boosted voltage $V_C$ rapidly increases as shown in FIG. 5. It is therefore preferable to set the change-ratio limitation release threshold TL to such a value that the power consumption does not rapidly increase and exceed the allowable electric power ($W_{BMAX}$ described below (see FIGS. 8 and 10)) due to the rapid increase in voltage $V_C$. For example, it is preferable to set the change-ratio limitation release threshold TL to "boostable electric power (reference electric power) $W_S$" described below.

FIG. 6 shows an example in which the voltage converting portion 4 shifts from the non-boost control to the boost control during the period in which the boost command value is limited. During the non-boost control, the voltage $V_B$ of the battery B becomes the output voltage $V_C$ of the voltage converting portion 4 regardless of the boost command value. Similarly, the voltage $V_B$ is the output voltage $V_C$ of the voltage converting portion 4 even when the limitation flag becomes active. In the case where the voltage converting portion 4 shifts from the non-boost control to the boost control during the period in which the limitation flag is active, shifting to the boost control is inhibited by limiting increase in boost command value.

As described below, the boosted voltage $V_C$ rapidly increases when the voltage converting portion 4 shifts from the non-boost control to the boost control. The power consumption also transiently and rapidly increases with this rapid increase in voltage $V_C$. If such a phenomenon occurs in a situation of the large power consumption, the power consumption may exceed the allowable electric power ($W_{BMAX}$ described below). However, since shifting from the non-boost control to the boost control is inhibited during the limitation period in which the limitation flag is active, such a rapid increase in voltage $V_C$ and the resultant increase in power consumption do not occur during the limitation period. Note that, as described above with reference to FIG. 5, after the limitation period has passed, the voltage converting portion 4 shifts from the non-boost control to the boost control, and the boosted voltage $V_C$ rapidly increases. It is therefore preferable to set the change-ratio limitation release threshold TL to such a value that the power consumption does not rapidly increase and exceed the allowable electric power ($W_{BMAX}$ described below) due to the rapid increase in voltage $V_C$. For example, it is preferable to set the change-ratio limitation release threshold TL to "boostable electric power (reference electric power) $W_S$" described below.

Note that an increase ratio of the boost command value per unit time is the highest when the voltage converting portion 4 is shifted from the non-boost control to the boost control. It is therefore considered that the potential difference resulting from increase in voltage $V_C$ after the limitation period is larger when the voltage converting portion 4 is shifted from the non-boost control to the boost control. Therefore, a limitation flag (limitation period) in the boost control and a limitation flag (limitation period) in the non-boost control may be provided separately. Both of the change-ratio limitation threshold TH and the change-ratio limitation release threshold TL may be set separately for the boost control and the non-boost control. Alternatively, a common value may be used as the change-ratio limitation threshold TH in the boost control and the non-boost control, and different values may be used as the change-ratio limitation release threshold TL in the boost control and the non-boost control. In the latter case, it is preferable to set the change-ratio limitation release threshold TL in the non-boost control to a smaller value than that of the change-ratio limitation release threshold TL in the boost control.

Hereinafter, the fact that the increase ratio of the boost command value becomes the highest when the voltage converting portion 4 is shifted from the non-boost control to the boost control, and the boosted voltage $V_C$ rapidly increases and the power consumption transiently increases accordingly, and the measures against this fact will be described in detail.

As described above, the TCU 10 shifts the control state of the voltage converting portion 4 on the condition that the target torque and the rotational speed of the rotating electrical machines exceed the shift boundary K2. More specifically, the TCU 10 performs a control to shift the control state of the voltage converting portion 4 from the non-boost control, in which the output of the battery B is supplied to the frequency converting portion 5 through the voltage converting portion 4 without being boosted, to the boost control, in which the output of the battery B is boosted by the voltage converting portion 4 and supplied to the frequency converting portion 5. When this boosting is started, that is, when the shift boundary K2 is exceeded, the power consumption transiently increases due to the dead time of the voltage converting portion 4, and the response delay of the feedback control including the TCU 10. As described above, the voltage converting portion 4 has the reactor 4a having its one end connected to the battery B, the upper-stage switching element 4c connecting the other end of the reactor 4a and the positive side of the frequency converting portion 5, and the lower-stage switching element 4d connecting the other end of the reactor 4a and the negative side of the frequency converting portion 5. When shifting from the non-boost control to the boost control, the dead time in which both the upper-stage switching element 4c and the lower-stage switching element 4d are turned off is provided, which causes the transient increase in power consumption.

Figure 7:
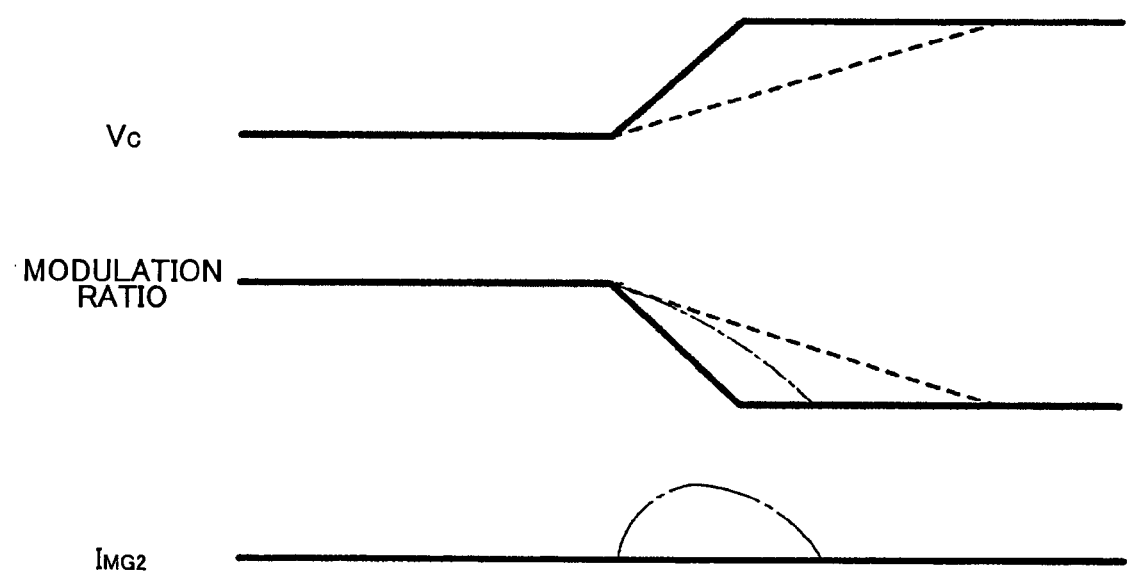
FIG. 7 is an illustration showing a transient phenomenon at the beginning of a boosting operation.
Figure 8:
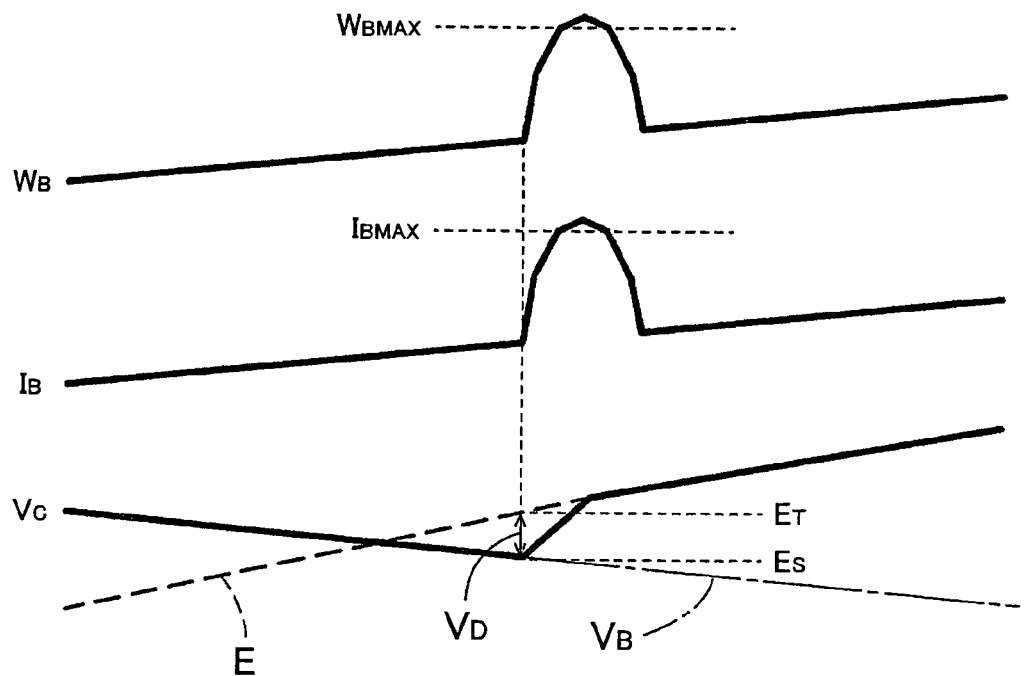
FIG. 8 is an illustration showing a transient phenomenon at the beginning of a boosting operation.

FIGS. 7 and 8 are illustrations showing a transient phenomenon at the beginning of the boosting operation. A waveform schematically shown at the top of FIG. 7 indicates a voltage $V_C$ boosted by the voltage converting portion 4. A waveform schematically shown in the middle of FIG. 7 indicates a modulation ratio of the frequency converting portion 5. A waveform schematically shown at the bottom of FIG. 7 indicates a current ($I_{MG1}$, $I_{MG2}$) of the rotating electrical machines.

In the dead time described above, both switching elements 4c, 4d of the voltage converting portion 4 are turned off, and thus, the boosting operation cannot be performed. Therefore, the boosting operation cannot be performed in a predetermined voltage range according to an individual system in a situation in which the boost target value is increasing. After the dead time has passed and the control state is shifted from the non-boost control to the boost state, the output of the voltage converting portion 4 rapidly and significantly increases beyond this voltage range. The rotating electrical machine drive device In includes the not-shown voltage sensor, which measures the voltage $V_B$ of the battery B and the voltage $V_C$ boosted by the voltage converting portion 4, and the TCU 10 obtains the measurement result. At this time, the TCU 10 may not be able to accurately obtain the value of the rapidly increasing voltage $V_C$ due to hardware filtering, software filtering, sampling intervals according to the operating clock of the TCU 10, and the like. In other words, although the voltage $V_C$ actually rapidly increases as schematically shown by solid line at the top of FIG. 1, the TCU 10 detects that the voltage $V_C$ gradually increases as shown by broken line in FIG. 1.

The TCU 10 computes the modulation ratio for conversion into the AC, according to the obtained voltage $V_C$, that is, the DC voltage value on the input side of the frequency converting portion 5. More specifically, the TCU 10 computes a PWM control duty. Since the TCU 10 has recognized the voltage $V_C$ as a value lower than the actual value, the TCU 10 calculates a higher modulation ratio than a required modulation ratio, and PWM-controls the frequency converting portion 5 according to the calculated modulation ratio. Although the modulation ratio actually needs to be reduced rapidly as schematically shown by solid line in the middle of FIG. 7, the modulation ratio is gradually reduced as shown by broken line in FIG. 7.

As a result, the rotating electrical machines are driven by receiving excessive electric power with respect to the target torque, and a motor current flowing in the rotating electrical machine (e.g., a motor current $I_{MG2}$ of the second rotating electrical machine MG2) increases. In other words, a ripple-shaped transient current is generated as schematically shown by chain line at the bottom of FIG. 7. The current flowing in the rotating electrical machine is measured by the current sensor 13, and the measurement result is applied to the TCU 10. The modulation ratio is then adjusted by feedback control as schematically shown by chain line in the middle of FIG. 7. However, generation of the transient current cannot be completely suppressed due to the delay time caused by such voltage and current measurement, and the response delay of the feedback control by the TCU 10.

Since this transient current is drawn from the battery B, the allowable current that can be output from the battery B may be exceeded under the conditions of large power consumption, such as the case where the rotating electrical machines are rotating under high load, resulting in occurrence of an overcurrent.

A waveform schematically shown at the top of FIG. 8 indicates electric power $W_B$ of the battery B, a waveform schematically shown in the middle indicates a current $I_B$ of the battery B, and a waveform schematically shown at the bottom indicates a boosted voltage $V_C$. Since the ripple-shaped transient current is drawn from the battery B as described above, a ripple is produced also in the current $I_B$ of the battery B. As a matter of course, a ripple is produced also in the electric power $W_B$ of the battery B. When the rotating electrical machines are being driven under high load, and the current ($I_{MG1}$, $I_{MG2}$) of the rotating electrical machines is increasing, the current $I_B$ of the battery B also increases. The voltage $V_B$ of the battery B decreases with increase in current $I_B$ of the battery B. In the non-boost control, the output voltage $V_C$ of the voltage converting portion 4 is the battery voltage $V_B$. Therefore, the output voltage $V_C$ of the voltage converting portion 4 also decreases with increase in current $I_B$ of the battery B, as shown at the bottom of FIG. 8.

On the other hand, it is now assumed that the boost command value of the voltage converting portion 4 is determined according to the rotational speed and the target torque of the rotating electrical machines, and the boost command value is a boost target value E after boosting operation. When the rotating electrical machines are being driven under high load, the boost target value E also tends to increase. Therefore, the boost target value E exceeds the output voltage $V_C$ of the voltage converting portion 4 at time t, and the voltage converting portion 4 starts its boosting operation.

At this time, the dead time DT is provided in order to reliably prevent short-circuit of the voltage converting portion 4, as described above. Therefore, if the on-time of the switching elements of the voltage converting portion 4 is shorter than the dead time DT, the switching elements cannot be actually switched, and the voltage converting portion 4 cannot perform the boosting operation. When the distance between the battery voltage $V_B$ and the boost target value E increases by a predetermined non-boostable voltage $V_D$, switching is actually started as the on-time of the switching elements becomes longer than the dead time DT. As a result, after the difference between the battery voltage $V_B$ and the boost target value E becomes larger than the non-boostable voltage $V_D$, the battery voltage is rapidly boosted including the non-boostable voltage $V_D$, whereby the boosted voltage $V_C$ increases rapidly. A battery overcurrent occurs when the current $I_B$ of the battery B including the ripple current generated by this rapid voltage increase exceeds the upper limit of the current of the battery B (allowable current $I_{BMAX}$).

In order to suppress shifting to the field-weakening control, the boost target value E and the non-boostable voltage $V_D$ at the shift boundary K2 for boosting the voltage $V_B$ of the battery B have predetermined values according to the system configuration of the rotating electrical machine drive device In. Thus, the voltage $V_B$ of the battery B when shifting from the non-boosting control to the boosting control also has an approximately fixed value. Therefore, the upper limit, that is, the allowable value, can be defined by the electric power $W_B$ of the battery (allowable electric power $W_{BMAX}$). Thus, if the battery electric power $W_B$ is controlled so as not to exceed the allowable electric power $W_{BMAX}$ when the voltage $V_C$ increases rapidly, the current $I_B$ of the battery B does not exceed the allowable current $I_{BMAX}$, and the overcurrent of the battery B can be suppressed. Hereinafter, a technique of suppressing the overcurrent of the battery B will be described.

Figure 9:
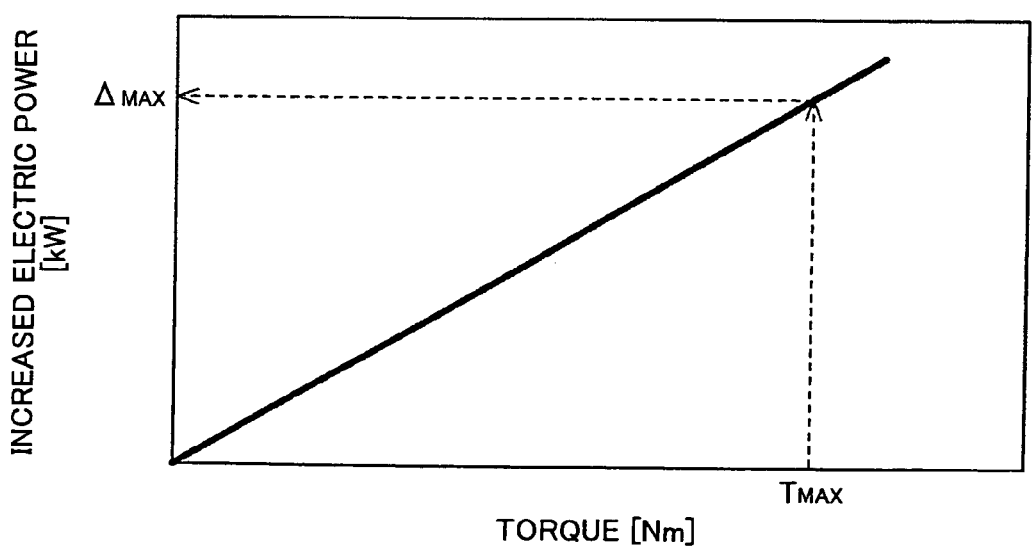
FIG. 9 is a correlation diagram between the torque of rotating electrical machines and the increased electric power.

First, the maximum value of increased electric power (Δ) is measured. Since the increased electric power value varies according to the torque of the rotating electrical machines, the increased electric power is measured with respect to a plurality of torques. FIG. 9 is a correlation diagram between the torque of the rotating electrical machines and the increased electric power, showing the measurement result. As can be seen from FIG. 9, the increased electric power increases as the torque increases. Thus, the increased electric power generated when the torque ($T_{MAX}$) of the rotating electrical machines has the maximum value is the maximum increased electric power ($Δ_{MAX}$).

Figure 10:
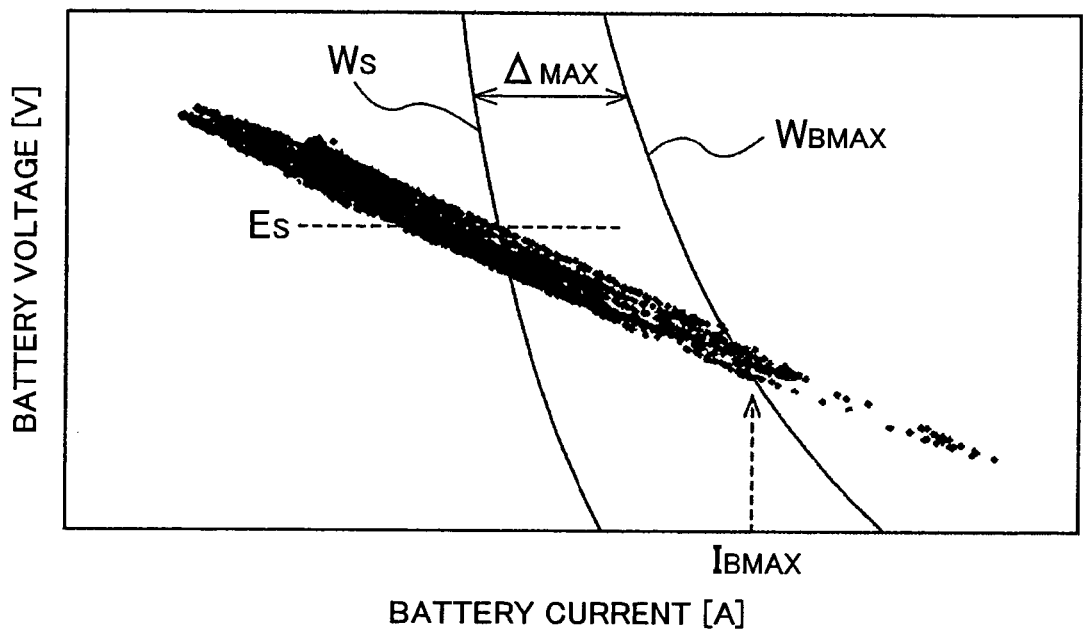
FIG. 10 is a scatter diagram showing V/I characteristics of a DC power source.

Next, the allowable electric power of the battery B is measured. FIG. 10 is a scatter diagram showing the measurement result of V/I characteristics of the battery B. A curve corresponding to the allowable current $I_{BMAX}$ of the battery B as shown on the scatter diagram is the allowable electric power $B_{MAX}$ of the battery B. The electric power obtained by subtracting the maximum increased electric power ($Δ_{MAX}$) obtained above, from the allowable electric power $B_{MAX}$ can be defined as the boostable electric power $W_S$. The boostable electric power $W_S$ corresponds to the reference electric power of the present invention.

As described above, the increased electric power (Δ) corresponding to the maximum torque ($T_{MAX}$) of the rotating electrical machines has the maximum value ($Δ_{MAX}$) among the possible values of the increased electric power. Therefore, the boostable electric power $W_S$ obtained by subtracting the increased electric power (Δ) from the allowable electric power $W_{BMAX}$ becomes the smallest when the target torque has the maximum value ($T_{MAX}$). By setting the shift boundary K based on this boostable electric power $W_S$, generation of the overcurrent of the battery B, associated with the transient voltage increase at the beginning of the boosting operation, can be suppressed in a desirable manner regardless of the magnitude of the target torque.

Moreover, a boost start voltage $E_S$ is obtained from the V/I characteristics of the battery B and the boostable electric power $W_S$. Note that, as described with reference to FIG. 8, the non-boostable voltage $V_D$ is generated due to the dead time DT, when the control state is shifted from the non-boost control to the boost control, that is, at the beginning of the boosting operation. Thus, a boost target voltage $E_T$ which is supposed to be applied as a boost command value to the voltage converting portion 4 is the sum of the boost start voltage $E_S$ and the non-boostable voltage $V_D$.

As shown in FIG. 3, the control state of the voltage converting portion 4 is shifted from the non-boost control to the boost control on the condition that the target torque and the rotational speed of the rotating electrical machines exceed the predetermined shift boundary K2 (K) which is set based on the correlation between the torque and the rotational speed. If the shift boundary K2 (K) is set in such a region that the power consumption of the rotating electrical machines does not reach the allowable electric power $W_{BMAX}$ even if the increased electric power is generated, the overcurrent of the battery B does not occur when shifting from the non-boost control to the boost control. In other words, the shift boundary K is set based on the boostable electric power $W_S$, i.e., electric power obtained by subtracting the increased electric power (e.g., the maximum value $Δ_{MAX}$) which is transiently produced upon shifting, from the allowable electric power $W_{BMAX}$ which can be output from the battery B, and is set in the region where the power consumption of the rotating electrical machines is equal to or less than the boostable electric power $W_S$.

Figure 11:
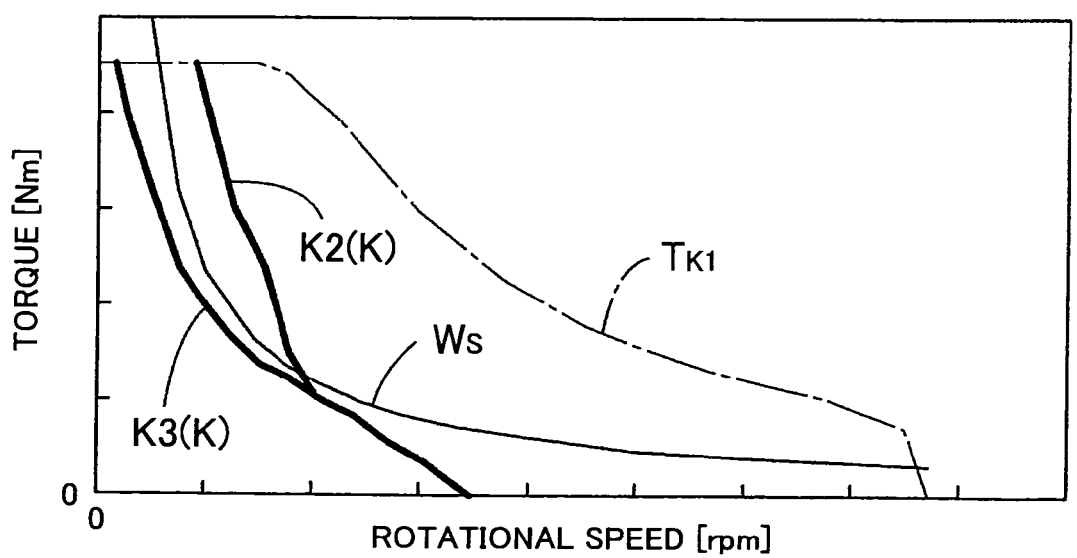
FIG. 11 is an illustration of setting a shift boundary in a correlation diagram between the rotational speed and the torque of the rotating electrical machines.

FIG. 11 is an illustration for setting the shift boundary K in the correlation diagram between the rotation speed and the torque of the rotating electrical machines. Although FIG. 11 corresponds to FIG. 3, FIG. 11 shows only a torque region in a positive direction, for simplification of illustration. In FIG. 11, the shift boundary K2 is a boundary provided to start the boosting operation in order to perform normal field control of the rotating electrical machines without shifting to the field-weakening control and without considering the increased electric power described above. Here, a boundary corresponding to the boostable electric power $W_S$ is added to the diagram in FIG. 11. In the drawing, a region located on the upper right side of the boundary corresponding to the boostable electric power $W_S$, that is, the direction in which the torque increases and the direction in which the rotational speed increases, is a region where the power consumption is larger than the boostable electric power $W_S$.

Referring to FIG. 11, the shift boundary K2 is set also in the region where the power consumption is larger than the boostable electric power $W_S$. Therefore, depending on the rotational speed and the target torque of the rotating electrical machines at the start of the boosting operation, the battery electric power $W_B$ may exceed the allowable electric power $W_{BMAX}$ of the battery B, and a current exceeding the allowable current $I_{BMAX}$ may be drawn from the battery B, causing an overcurrent. Therefore, a boundary for starting the boosting operation toward the boost target voltage $E_T$ at the start of the boosting operation is set as a shift boundary K3 (K) which is set only in a region located on the lower left side of the boundary corresponding to the boostable electric power $W_S$ in the drawing. In other words, the shift boundary K3 (K) is set based on the boostable electric power $W_S$, i.e., electric power obtained by subtracting the increased electric power (e.g., the maximum value $\Delta_{MAX}$) which is generated transiently upon shifting, from the allowable electric power $W_{BMAX}$ which can be output from the battery B, and is set in the region where the power consumption of the rotating electrical machines is equal to or less than the boostable electric power $W_S$.

FIG. 12 is a graph showing the boost target voltages $E_T$ for each target torque. A plurality of curves are shown in the drawing in the order of the magnitude of the target torque: the target torque is smaller toward the right, and larger toward the left. FIG. 12A shows a case in which the shift boundary K2 is applied, and FIG. 12B shows a case in which the shift boundary K3 in FIG. 11 is applied. As shown in FIG. 11, the shift boundaries K2 and K3 have the same curve in a low target-torque region. Thus, the shift boundaries K2 and K3 have the same curves on the right side of FIGS. 12A and 12B. On the other hand, as shown in FIG. 11, the shift boundaries K2 and K3 have different curves in a high target-torque region. These drawings show that the boost target voltage $E_T$ of FIG. 12B has a higher voltage value than that of FIG. 12A on the left side of FIGS. 12A and 12B, especially in a region surrounded by an oval in FIG. 12B.

As the load on the rotating electrical machines increases and the power consumption of the rotating electrical machines increases, the current $I_B$ to be drawn from the battery B increases, and the voltage $V_B$ of the battery B decreases. In this case, the decreasing voltage $V_B$ of the battery B (the output voltage $V_C$ of the voltage converting portion 4 before the boosting operation is started) becomes lower than the boost target voltage $E_T$ at an earlier timing by increasing the boost target voltage $E_T$. In other words, the boosting operation is started when the voltage $V_B$ of the battery B (the output voltage $V_C$ of the voltage converting portion 4) has a higher value than that in conventional examples. That is, the boosting operation is started while the power consumption is still lower than the allowable electric power even if the increased electric power ($\Delta$) is included. Therefore, the overcurrent of the battery B due to the increased electric power does not occur even if the boosting operation is started in a situation of large power consumption.

As described above, in the case where the power consumption (estimated electric power) of the rotating electrical machine exceeds a predetermined electric limitation value (the change-ratio limitation threshold TH, the change-ratio limitation release threshold TL), that is, in the case where increase in boost command value is limited in the limitation period, the boost command value may rapidly increase after the limitation period, whereby the boosted voltage $V_C$ may be increased (see FIGS. 5 and 6). Such increase is more abrupt when the voltage converting portion 4 is shifted from the non-boost control to the boost control than when the boost control of the voltage converting portion 4 is performed. Thus, by setting the shift boundary K as the shift boundary K3 which is set in the region where the power consumption of the rotating electrical machines is equal to or less than the boostable electric power (reference electric power) $W_S$, the possibility that the power consumption exceeds the allowable electric power $W_{BMAX}$ when the voltage converting portion 4 is shifted from the non-boost control to the boost control after the limitation period can be reduced.

The change-ratio limitation release threshold TL can be set to the boostable electric power (reference electric power) $W_S$ in order to reliably prevent the power consumption from exceeding the allowable electric power $W_{BMAX}$ when the voltage converting portion 4 is shifted from the non-boost control to the boost control and the boosted voltage $V_C$ rapidly increases. In the case where the boost control is being performed and the limitation period has been provided, however, this change-ratio limitation release threshold TL is too low as a release threshold, and this unnecessarily extends the limitation period. It is possible to use separate change-ratio limitation release thresholds TL depending on whether the boost control or the non-boost control is being performed at the beginning of the limitation period. However, if using such separate change-ratio limitation release thresholds TL depending on the operation state is avoided as much as possible, the system reliability can be improved and the computation load on the system can be reduced.

Thus, the shift boundary K is set to the above shift boundary K3. This significantly reduces the possibility that the power consumption exceeds the allowable electric power $W_{BMAX}$ when the voltage converting portion 4 is shifted from the non-boost control to the boost control and the boosted voltage $V_C$ rapidly increases. That is, since shifting from the non-boost control to the boost control is more likely to have been completed before the limitation period is started, an increased amount of the voltage $V_C$ after the limitation period is equal to an increased amount thereof in the boost control which is smaller than an increased amount in the non-boost control. Accordingly, increase in power consumption resulting from the increased voltage $V_C$ after the limitation period is suppressed, and the change-ratio limitation release threshold TL can be set to a higher value than the boostable electric power (reference electric power) $W_S$. As a result, the limitation period is not excessively extended, whereby the rotating electrical machines can be driven with high operation efficiency. Moreover, it is not necessary to use separate change-ratio limitation release thresholds TL depending on whether the boost control or the non-boost control is being performed at the beginning of the limitation period. This improves the system reliability and reduces the computation load on the system.

Other Embodiments (1) The above embodiment has been described with respect to an example in which the shift boundary K3 is set according to the maximum value $T_{MAX}$ of the target torque. In other words, the boostable power $W_S$ is set to a value obtained by subtracting the increased electric power (the maximum value $\Delta_{MAX}$) produced when the target torque has the maximum value ($T_{MAX}$) from the allowable electric power $W_{BMAX}$, and the shift boundary K3 is set in a region where the power consumption of the rotating electrical machines becomes equal to or lower than the boostable electric power $W_S$. However, different shift boundaries K may be set according to the target torques.

In other words, electric power obtained by subtracting the increased electric power generated for one target torque from the allowable electric power $W_{BMAX}$ may be set as the boostable electric power $W_S$ corresponding to this target torque, and the shift boundary K may be set in a region where power consumption of the rotating electrical machines at this target torque becomes equal to or less than the boostable electric power $W_S$. As shown in FIG. 9, the increased electric power increases as the target torque increases. Thus, the shift boundary K is preferably set to a lower electric power side as the target torque becomes higher. More specifically, the boostable electric power $W_S$ is set so that the boostable electric power $W_S$ increases as the target torque decreases, while the minimum boostable electric power $W_S$ is set to electric power obtained by subtracting the maximum increased electric power ($\Delta_{MAX}$) generated when the target torque has the maximum value ($T_{MAX}$), from the allowable electric power $W_{BMAX}$.

(2) The above embodiment has been described with respect to an example in which a vehicle is a hybrid vehicle including rotating electrical machines as a drive source, and a drive source other than the rotating electrical machines (engine). However, the present invention is intended for systems including rotating electrical machines which are drivingly controlled by a rotating electrical machine drive device having a voltage converting portion. Therefore, the systems may include only the rotating electrical machines as a drive source, and the present invention may also be applied to electric vehicles having rotating electrical machines as a drive source.

(3) The above embodiment has been described with respect to an example in which a pair of rotating electrical machines are provided in a hybrid vehicle, where one of the rotating electrical machines serves as a motor and the other serves as a generator. However, the present invention may also be applied to any hybrid vehicle including a single rotating electrical machine, and having a mode in which this single rotating electrical machine serves as a motor and a generator.

The present invention may be applied to a rotating electrical machine control system that includes a power supply converting portion for boosting an output of a DC power source, and that controls a rotating electrical machine for driving a vehicle. The present invention may further be applied to a vehicle drive system including the rotating electrical machine control system. For example, the present invention may be applied to electric cars driven by a motor as a rotating electrical machine, and hybrid cars driven by an internal combustion engine and a motor.

What is claimed is:

1. A rotating electrical machine control system, comprising:
a frequency converting portion that is interposed between a rotating electrical machine for driving a vehicle and a DC power source for supplying electric power to the rotating electrical machine, and that converts an output of the DC power source to an AC output at least during powering operation of the rotating electrical machine;
a voltage converting portion that is interposed between the DC power source and the frequency converting portion, and that boosts the output of the DC power source based on a boost command value which is set according to a target torque and a rotational speed of the rotating electrical machine; and
a control portion for controlling the frequency converting portion and the voltage converting portion, wherein the control portion limits an increase in the boost command value when power consumption of the rotating electrical machine exceeds a predetermined electric-power limitation value.

2. The rotating electrical machine control system according to claim 1, wherein
the electric-power limitation value is set to a value obtained by subtracting electric power increased in a delay time before the control portion obtains a boosted voltage value boosted by the voltage converting portion, from allowable electric power output from the DC power source.

3. The rotating electrical machine control system according to claim 2, wherein
the control portion determines the boost command value which is set according to the target toque and the rotational speed of the rotating electrical machine, and performs a control to shift a control state from non-boost control, in which the output of the DC power source is supplied to the frequency converting portion through the voltage converting portion without being boosted, to boost control, in which the output of the DC power source is boosted by the voltage converting portion and supplied to the frequency converting portion, on a condition that the boost command value exceeds a voltage of the DC power source, and
electric power which is obtained by subtracting increased electric power transiently produced during the shifting, from the allowable electric power output from the DC power source, and which is lower than the electric-power limitation value is used as reference electric power, and the shifting from the non-boost control to the boost control is performed in a region where the power consumption of the rotating electrical machine is equal to or lower than the reference electric power.

4. The rotating electrical machine control system according to claim 3, wherein
the power consumption of the rotating electrical machine is obtained by using the target torque and the rotational speed of the rotating electrical machine.

5. The rotating electrical machine control system according to claim 3, wherein
the reference electric power is set as electric power obtained by subtracting the increased electric power generated when the target torque has a maximum value, from the allowable electric power.

6. The rotating electrical machine control system according to claim 1, wherein
the boost command value defines a voltage value of an output of the voltage converting portion or a boosting ratio in the voltage converting portion, and
the control portion limits the increase in the boost command value by fixing the boost command value.

7. The rotating electrical machine control system according to claim 1, wherein
the control portion limits the increase in the boost command value by inhibiting the shifting from the non-boost control, in which the output of the DC power source is supplied to the frequency converting portion through the voltage converting portion without being boosted, to the boost control, in which the output of the DC power source is boosted by the voltage converting portion and supplied to the frequency converting portion.

8. The rotating electrical machine control system according to claim 1, wherein
the frequency converting portion converts a DC input thereto into an AC, based on a modulation ratio which is set according to a voltage value of the DC input to the frequency converting portion and the target torque.

9. A vehicle drive system, comprising:
the rotating electrical machine control system according to claim 1;
a first rotating electrical machine and a second rotating electrical machine as the rotating electrical machine; and
a power distribution mechanism for distributing a driving force generated from a drive source other than the first rotating electrical machine and the second rotating electrical machine, wherein
one of the driving force distributed by the power distribution mechanism is transmitted to a wheel, another one of the driving force distributed by the power distribution mechanism is transmitted to the first rotating electrical machine, and a driving force generated by the second rotating electrical machine is transmitted to the wheel.

10. The vehicle drive system according to claim 9, wherein
the power distribution mechanism includes a planetary gear mechanism having a first rotary element, a second rotary element, and a third rotary element in order of a rotational speed, and
the first rotating electrical machine is connected to the first rotary element, the drive source other than the rotating electrical machines is connected to the second rotary element, and the second rotating electrical machine and the third rotary element are connected to the wheel.

* * * * *